(12) United States Patent
Nennemann et al.

(10) Patent No.: US 8,088,880 B2
(45) Date of Patent: *Jan. 3, 2012

(54) NANOPARTICLE-MODIFIED POLYISOCYANATES

(75) Inventors: Arno Nennemann, Bergisch Gladbach (DE); Michael Mager, Leverkusen (DE); Markus Mechtel, Bergisch Gladbach (DE); Thomas Klimmasch, Leverkusen (DE); Christoph Gurtler, Cologne (DE); Christian Wamprecht, Neuss (DE)

(73) Assignee: Bayer MaterialScience AG, Leverkusen (DE)

( * ) Notice: Subject to any disclaimer, the term of this patent is extended or adjusted under 35 U.S.C. 154(b) by 54 days.

This patent is subject to a terminal disclaimer.

(21) Appl. No.: 11/985,448

(22) Filed: Nov. 15, 2007

(65) Prior Publication Data

US 2008/0119601 A1 May 22, 2008

(30) Foreign Application Priority Data

Nov. 17, 2006 (DE) .................. 10 2006 054 289

(51) Int. Cl.
*C08G 18/06* (2006.01)
(52) U.S. Cl. .................................................. 528/45
(58) Field of Classification Search .......... 528/45
See application file for complete search history.

(56) References Cited

U.S. PATENT DOCUMENTS

| | | | | |
|---|---|---|---|---|
| 4,345,053 A * | 8/1982 | Rizk et al. ............ | 525/440.03 |
| 4,625,012 A * | 11/1986 | Rizk et al. ............ | 528/28 |
| 4,959,277 A | 9/1990 | Saeki et al. ............ | 428/623 |
| 5,364,955 A * | 11/1994 | Zwiener et al. ............ | 556/418 |
| 5,587,502 A | 12/1996 | Moren et al. ............ | 556/420 |
| 5,990,257 A * | 11/1999 | Johnston et al. ............ | 528/28 |
| 5,998,504 A * | 12/1999 | Groth et al. ............ | 523/213 |
| 6,020,419 A | 2/2000 | Bock et al. ............ | 524/590 |
| 6,022,919 A | 2/2000 | Komoto et al. ............ | 524/430 |
| 6,025,455 A * | 2/2000 | Yoshitake et al. ............ | 528/10 |
| 6,046,270 A | 4/2000 | Roesler et al. ............ | 524/590 |
| 6,051,672 A * | 4/2000 | Burns et al. ............ | 528/10 |
| 6,310,170 B1 * | 10/2001 | Johnston et al. ............ | 528/38 |
| 6,316,535 B1 | 11/2001 | Caldwell et al. ............ | 524/425 |
| 6,593,417 B1 * | 7/2003 | Anderson et al. ............ | 524/588 |
| 6,800,413 B2 * | 10/2004 | Barthel et al. ............ | 430/108.3 |
| 6,830,811 B2 * | 12/2004 | Chao ............ | 428/405 |
| 2003/0236360 A1 * | 12/2003 | Gurtler et al. ............ | 525/453 |
| 2005/0137324 A1 * | 6/2005 | Roesler et al. ............ | 524/589 |
| 2005/0170190 A1 | 8/2005 | Mori et al. ............ | 428/425.9 |
| 2005/0261389 A1 * | 11/2005 | Bratolavsky et al. ............ | 522/71 |
| 2006/0247370 A1 * | 11/2006 | Frye et al. ............ | 524/588 |
| 2007/0055016 A1 * | 3/2007 | Niesten et al. ............ | 525/100 |
| 2007/0208089 A1 * | 9/2007 | Poppe et al. ............ | 516/77 |

FOREIGN PATENT DOCUMENTS

| | | |
|---|---|---|
| JP | 2004-256753 | 9/2004 |
| JP | 2005-162858 | 6/2005 |
| JP | 2005-171017 | 6/2005 |
| JP | 2005-320522 | 11/2005 |
| WO | 01/05883 A1 | 1/2001 |

OTHER PUBLICATIONS

Data sheet for Aerosil R 972 from http://www.aerosil.com, 4 pages, 2010.*
Product information sheet for Aerosil R 974, 2 pages, 2008.*
Polymer for Advanced Technologies, 16(4), (month unavailable) 2005, p. 328-331,.
Sung-Ii Lee et al, "Synthesis of polyether-based polyurethane-silica nanocomposites with high elongation property".

* cited by examiner

*Primary Examiner* — Robert Loewe
(74) *Attorney, Agent, or Firm* — Robert S. Klemz; Noland J. Cheung

(57) ABSTRACT

The present invention relates to innovative, nanoparticle-modified polyisocyanates, a process for their preparation and to their use in coating compositions and adhesives. The process comprises the steps of 1) reacting A) polyisocyanates with B) alkoxysilanes, and subsequently 2) incorporating by dispersion inorganic particles, optionally surface modified, having an average particle size of less than 200 nm as determined by means of dynamic light scattering in dispersion, where the alkoxysilanes are according to formula (I)

$$Q\text{-}Z\text{-}SiX_aY_{3-a} \qquad (I)$$

in which Q is an isocyanate-reactive group, X is a hydrolysable group, Y is identical or different alkyl groups, Z is a $C_1$-$C_{12}$ alkylene group and a is an integer from 1 to 3.

11 Claims, No Drawings

NANOPARTICLE-MODIFIED POLYISOCYANATES

CROSS-REFERENCE TO RELATED APPLICATION

This application claims priority under 35 U.S.C. §119 (a-d) to German application Serial No. 10 2006 054 289.4, filed Nov. 17, 2006.

FIELD OF THE INVENTION

The present invention relates to innovative, nanoparticle-modified polyisocyanates and to their use in coating compositions and adhesives.

BACKGROUND OF THE INVENTION

Nanoparticles in polymeric coatings may bring about targeted improvement in properties such as scratch resistance, UV protection, conductivity, etc. It is the control of surface modification and dispersing of the nanoparticles that determines the required transparent appearance of the coatings and also their properties. (Nanoparticle composites for coating applications. Cayton, Roger H. Editor(s): Laudon, Matthew; Romanowicz, Bart. NSTI Nanotech 2004, Boston, Mass., United States, Mar. 7-11, (2004), 3 312-315).

With regard to the introduction of the nanoparticles into coating or adhesive formulations there are different approaches that have been taken in the past. The particles can be mixed directly into the resin component or curative component or into the ready-to-apply coating compositions. In the case of aqueous systems there is the possibility of dispersing the particles into the aqueous phase. There have additionally been descriptions of the preparation of the particles in situ in one of the binder components, and of surface adaptation either to the resin or to the curative component.

From a practical viewpoint it is advantageous to disperse the nanoparticles in the form of stable masterbatches in one of the components, to ensure long-term storage stability and ease of handling at the stage of formulating, for example, coating materials or adhesives. In the end application the nanoparticles must likewise be dispersed well and finely, in order to produce advantageous properties such as transparency, scratch resistance, conductivity, etc.

In the art the nanoparticles are typically dispersed into the resin component, into the aqueous phase and/or into the completed mixture of curative and resin shortly prior to curing. This generally requires the surface of the nanoparticles to be adapted to the specific matrix of the coating composition or adhesive. A disadvantage of simply mixing modified nanoparticles in is the dependence of the stability on the complete formulation, i.e. on all the formulation constituents. Varying one parameter can lead here to separation (Pilotek, Steffen; Tabellion, Frank (2005), European Coatings Journal, 4, 170ff).

In "Polymers for Advanced Technologies (2005), 16(4), 328-331" a mixture of poly(tetramethylene glycol) and silicon dioxide produced by flame pyrolysis (nanosilica) is reacted with 4,4-diphenylmethane diisocyanate and the product is subjected to chain extension with 1,4-butanediol. The polyurethane chains were attached covalently via urethane bonds to the silica surfaces. Polyurethane films based on these approaches showed improved mechanical properties such as tensile strength and breaking elongation.

This kind of fumed silica is composed substantially of aggregates of sintered primary particles, and therefore, in comparison with silica in disperse form as primary particles, prepared wet-chemically, has a broader particle size distribution and a larger average particle size. In the case of fumed silica, these grave differences often lead to instances of inhomogeneity and turbidity even in the coating films and adhesive bonds that are obtainable from them. Furthermore, the covalent attachment of the particles to the polyurethane network may be critical for certain applications such as automotive clearcoating, since significant crosslinking raises the glass transition temperature and prevents elastic reflow. The reflow is of importance for the wet scratch resistance (Meier-Westhues, U. et al. (1999), Polyurethane clearcoats with optimized resistance to scratching and chemicals, Praxis-Forum, Meeting of the "Automobilkreis Spezial", Bad Nauheim).

WO 2001005883 describes compact or cellular polyurethane elastomers with dispersed, non-agglomerated silica nanoparticles, and the process for preparation, the particles being able to be introduced into the polyol phase, into low molecular mass crosslinking agents or chain extenders and also, via inert solvent dispersions, into the isocyanate phase. No remarks are made in respect of film turbidity or gelling.

JP 002005162858 and JP 002005171017 describe hydrophilic polyurethane resins formed from polysiloxane, chain extender, polyisocyanate and high molecular mass polyols or polyamines. Organic silica sols are incorporated into such resins by dispersion, and the solvent is subsequently separated off. Features described as being advantageous in connection with this silica-modified resin include the high water adsorption and, in association therewith, anti-fogging properties, high transparency and flexibility, among others. Particle-modified polyisocyanates, however, are not disclosed.

In the first step of EP-A 372957 a prepolymer is prepared from isocyanate, polyol and amine, and excess NCO groups are blocked. The prepolymer, containing OH, NCO (blocked) and $NH_2$ groups, is then blended with further formulating ingredients, including silica sol, and is applied as a primer and cured. Not described are the gelling stability and clouding stability of such silica-modified polyisocyanates.

JP 2005320522 describes the production of transparent hardcoat coatings for plastic films. NCO-containing and double-bond-containing polymers, silica sol in organic solvent, catalyst and acrylate component are mixed and applied to PET films, and cured thermally and via UV light.

JP 2004256753 likewise describes the use of nonmodified, colloidal silica containing silanol groups which is reacted with double-bond-containing isocyanates (2-methacryloyloxyethyl isocyanate). The Si—OH groups of the silica particles form a urethane bond as a result of reaction with NCO groups. The coating material actually crosslinks via polymerization of the acrylate groups. Disadvantageous features of these products are the low transparency of 88.2% and the high, uncontrolled degree of crosslinking, caused by the silanol-containing nanoparticle surfaces, which can be considered, for example, to be advantageous for the reflow characteristics and hence for the scratch resistance in the case of automotive coating materials.

DE-A 198 11 790 describes nanoparticle-containing, transparent film-forming binders into which fumed silicas and organically modified pyrogenic silicas have been incorporated into OH-functional binders by means of nozzle jet dispersion. Nozzle jet dispersion requires high shearing energies and is not a guarantee of complete nanoparticle dispersion. Sintered aggregates of fumed silicas cannot be reliably dispersed in primary particle form in that way and so may lead to instances of film clouding.

EP-A 1054046 adds microscale inorganic fillers to one or both binder components of an aqueous two-component PU formulation, the fillers specified including, preferably calcium carbonate or $TiO_2$, sand, clay mineral, mica and dolomite.

Disadvantageous features of the methods stated above include the fact that the particles and particle agglomerates employed are too large to achieve such homogeneous dispersion in the binder components that clouding-free films can be produced even at high coat thicknesses. Likewise disadvantageous is the fact that the particles are used in very largely unmodified form, so that depending on the other binder components there may be phase separation and inhomogeneities in the ready-to-apply formulation. As a result of the relatively high crosslinking density, the covalent attachment of the particles to the polyurethane matrix leads to comparatively poor wet scratch resistance and to improvable reflow characteristics, and also to a buildup in viscosity, and often gelling, when the formulations are stored.

The use of surface-modified silica particles is described in DE-A 19540623, the particles being incorporated in a matrix material. Specified as matrix material are numerous polymeric materials, albeit none of the curatives such as epoxides or polyisocyanates that are typically employed in coating technology.

U.S. Pat. No. 6,022,919 discloses specific polyacrylate resins which are admixed together with silane-functionalized inorganic particles and are cured with isocyanates. The crosslinked films are notable for weathering stability plus resistance to effects caused by light or chemicals. To what extent such sols can be incorporated into the polyisocyanate component without increase in viscosity or gelling, on the other hand, is not apparent.

SUMMARY OF THE INVENTION

It was an object of the present invention, then, to provide polyisocyanates containing nanoscale inorganic particles incorporated by dispersion, the intention being that the polyisocyanates thus modified should feature stability of viscosity and stability with respect to agglomeration during storage. A further aim was that these polyisocyanates should give rise to clouding-free coatings having advantageous properties through polyol crosslinking or polyamine crosslinking.

It has surprisingly now been found that a partial reaction of isocyanate groups in oligomeric isocyanates with alkoxysilanes leads to transparent, gelling-stable dispersions of inorganic nanoparticles in different isocyanates modified in this way.

The present invention accordingly provides a process for preparing nanoparticle-modified polyisocyanates, in which A) polyisocyanates are reacted with
B) alkoxysilanes of the formula (I)

$$Q-Z-SiX_aY_{3-a} \qquad (I)$$

in which
Q is an isocyanate-reactive group,
X is a hydrolysable group,
Y is identical or different alkyl groups,
Z is a $C_1$-$C_{12}$ alkylene group and
a is an integer from 1 to 3,
and subsequently
C) optionally surface-modified inorganic particles having an average particle size (number average value) of less than 200 nm as determined by means of dynamic light scattering in dispersion are incorporated by dispersion.

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

In A) it is possible in principle to use all of the NCO-functional compounds having more than one NCO group per molecule that are known per se to the skilled person. These compounds preferably have NCO functionalities of 2.3 to 4.5, NCO group contents of 11.0% to 24.0% by weight and monomeric diisocyanate contents of preferably less than 1% by weight, more preferably lower than 0.5% by weight.

Polyisocyanates of this kind are obtainable through modification of simple aliphatic, cycloaliphatic, araliphatic and/or aromatic diisocyanates and may contain uretdione, isocyanurate, allophanate, biuret, iminooxadiazinedione and/or oxadiazinetrione structures. Moreover, such polyisocyanates can be used as NCO-containing prepolymers. Polyisocyanates of this kind are described for example in Laas et al. (1994), J. prakt. Chem. 336, 185-200 or in Bock (1999), Polyurethane für Lacke und Beschichtungen, Vincentz Verlag, Hanover, pp. 21-27.

Suitable diisocyanates for preparing such polyisocyanates are any desired diisocyanates of the molecular weight range 140 to 400 g/mol that are obtainable through phosgenation or by phosgene-free processes, such as by thermal urethane cleavage, for example, and that contain aliphatically, cycloaliphatically, araliphatically and/or aromatically attached isocyanate groups, such as 1,4-diisocyanatobutane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)-isocyanatomethylcyclohexane, bis(isocyanatomethyl)norbornane, 1,3- and 1,4-bis(1-iso-cyanato-1-methylethyl)benzene (TMXDI), 2,4- and 2,6-diisocyanatotoluene (TDI), 2,4'- and 4,4'-diisocyanatodiphenylmethane (MDI), 1,5-diisocyanatonaphthalene or any desired mixtures of such diisocyanates.

It is preferred in A) to use polyisocyanates of the abovementioned kind that are based on IPDI, MDI, TDI, HDI or mixtures thereof.

In formula (I) the group X is preferably an alkoxy or hydroxyl group, with particular preference methoxy, ethoxy, propoxy or butoxy.

Y in formula (I) is preferably a linear or branched $C_1$-$C_4$ alkyl group, preferably methyl or ethyl.

Z in formula (I) is preferably a linear or branched $C_1$-$C_4$ alkylene group.

In formula (I) a stands preferably for 1 or 2.

In formula (I) the group Q is preferably a group which reacts towards isocyanates with formation of urethane, urea or thiourea. Such groups are preferably OH, SH or primary or secondary amino groups.

Preferred amino groups are of the formula —$NHR^1$, with $R^1$ being hydrogen, a $C_1$-$C_{12}$ alkyl group or a $C_6$-$C_{20}$ aryl group or an aspartic ester radical of the formula $R^2OOC$—$CH_2$—$CH(COOR^3)$—, $R^2$, $R^3$ preferably being identical or different alkyl radicals which may also optionally be branched, with 1 to 22 carbon atoms, preferably 1 to 4 carbon atoms. Most preferably $R^2$, $R^3$ are each methyl or ethyl radicals.

Alkoxysilane-functional aspartic esters of this kind are obtainable as described in U.S. Pat. No. 5,364,955, in a conventional manner by addition of amino-functional alkoxysilanes to maleic or fumaric esters.

Examples with amino-functional alkoxysilanes of the kind which can be used as compounds of the formula (I) or for the preparation of the alkoxysilyl-functional aspartic esters include 2-aminoethyldimethylmethoxysilane, 3-aminopropyltrimethoxysilane, 3-aminopropyltriethoxy-silane, 3-aminopropylmethyldimethoxysilane and aminopropylmethyldiethoxysilane.

As aminoalkoxysilanes with secondary amino groups of the formula (I) in B) it is also possible for there to be N-methyl-3-aminopropyltrimethoxysilane, N-methyl-3-aminopropyltriethoxysilane, N-phenyl-3-aminopropyltrimethoxysilane, bis(gamma-trimethoxysilylpropyl)amine, N-butyl-3-aminopropyltrimethoxysilane, N-butyl-3-aminopropyltriethoxysilane, N-ethyl-3-aminoisobutyltrimethoxysilane, N-ethyl-3-aminoisobutyltriethoxysilane or N-ethyl-3-aminoisobutylmethyl-dimethoxysilane, N-ethyl-3-aminoisobutylmethyldiethoxysilane, and also the analogous $C_2$-$C_4$ alkoxysilanes.

Suitable maleic or fumaric esters for preparing the aspartic esters are dimethyl maleate, diethyl maleate, di-n-butyl maleate and also the corresponding fumaric esters. Dimethyl maleate and diethyl maleate are particularly preferred.

A preferred aminosilane for preparing the aspartic esters is 3-aminopropyltrimethoxysilane or 3-aminopropyltriethoxysilane.

The reaction of the maleic and/or fumaric esters with the aminoalkylalkoxysilanes takes place within a temperature range from 0 to 100° C., the proportions generally being selected such that the starting compounds are employed in a 1:1 molar ratio. The reaction may be carried out in bulk or else in the presence of solvents such as dioxane, for example. The use of solvents as well, however, is less preferred. It will be appreciated that it is also possible to use mixtures of different 3-aminoalkylalkoxysilanes with mixtures of fumaric and/or maleic esters.

Preferred alkoxysilanes for modifying the polyisocyanates are secondary aminosilanes, of the type described above, with particular preference, aspartic esters of the type described above and di- and/or monoalkoxysilanes.

The aforementioned alkoxysilanes can be used individually or else in mixtures for modification.

In the modification the ratio of free NCO groups of the isocyanate for modification to the NCO-reactive groups Q of the alkoxysilane of the formula (I) is preferably 1:0.01 to 1:0.75, with particular preference 1:0.05 to 1:0.4.

In principle it is of course also possible to modify higher fractions of NCO groups with the aforementioned alkoxysilanes, but care should be taken to ensure that the number of free NCO groups available for crosslinking is still sufficient for satisfactory crosslinking.

The reaction between aminosilane and polyisocyanate is carried out at 0-100° C., preferably at 0-50° C., particularly preferably at 15-40° C. Where appropriate, an exothermal reaction may be controlled by cooling.

Following the silane modification, the free NCO groups of the polyisocyanates thus modified can still be modified further. This may involve, for example, partial or complete blocking of the free NCO groups with blocking agents that are known per se to the skilled person (on the blocking isocyanate groups see DE-A 10226927, EP-A 0 576 952, EP-A 0 566 953, EP-A 0 159 117, U.S. Pat. No. 4,482,721, WO 97/12924 or EP-A 0 744 423). Examples include butanone oxime, e-caprolactam, methyl ethyl ketoxime, malonic esters, secondary amines, and also triazole and pyrazole derivatives.

Blocking the NCO groups before incorporation of the nanoparticles has the advantage that the nanoparticle-modified polyisocyanates based thereon tend to have a better stability in respect of the amount of NCO groups subsequently available for crosslinking than similar products which still possess free NCO groups.

In the process of the invention it is possible in principle at any time to add the NCO-inert solvents known per se to the skilled person. These are, for example, ketone-free solvents such as butyl acetate, 1-methoxy-2-propyl acetate, ethyl acetate, toluene, xylene, solvent naphtha and mixtures thereof.

During or subsequent to the modification of the polyisocyanate the optionally surface-modified nanoparticles are incorporated. This can be done by simply stirring-in the particles. Also conceivable, however, is the use of increased dispersing energy, of the kind which can be effected, for example, by ultrasound, jet dispersing or high-speed stirrers operating on the rotor-stator principle. Preference is given to incorporation by simple mechanical stirring.

The particles can be used in principle both in powder form and in the form of suspensions or dispersions in suitable, preferably isocyanate-inert, solvents. It is preferred to use the particles in the form of dispersions in organic solvents.

Solvents suitable for the organosols are methanol, ethanol, isopropanol, acetone, 2-butanone, methyl isobutyl ketone, and also the solvents that are commonplace in polyurethane chemistry, such as butyl acetate, ethyl acetate, 1-methoxy-2-propyl acetate, toluene, 2-butanone, xylene, 1,4-dioxane, diacetone alcohol, N-methylpyrrolidone, dimethylacetamide, dimethylformamide, dimethyl sulphoxide, methyl ethyl ketone or any desired mixtures of such solvents.

Preferred solvents in this context are the solvents which are common per se in polyurethane chemistry, such as butyl acetate, ethyl acetate, 1-methoxy-2-propyl acetate, toluene, 2-butanone, xylene, 1,4-dioxane, diacetone alcohol, N-methylpyrrolidone, dimethylacetamide, dimethylformamide, dimethyl sulphoxide, methyl ethyl ketone or any desired mixtures of such solvents.

Particularly preferred solvents are alcohol- and ketone-free solvents such as butyl acetate, 1-methoxy-2-propyl acetate, ethyl acetate, toluene, xylene, solvent naphtha and mixtures thereof.

In relation to the amount of NCO groups subsequently available for crosslinking, it has proved to be advantageous to avoid ketones and alcohols as solvents both for the particle dispersions and as process solvents during the polyisocyanate modification, since in that case a comparatively higher breakdown of NCO groups is observed during the storage of the nanoparticle-modified polyisocyanates prepared therefrom.

If the polyisocyanates are blocked in an additional step, ketones or alcohols may then also be used as solvents.

In one preferred embodiment of the invention particles used in C) are inorganic oxides, mixed oxides, hydroxides, sulphates, carbonates, carbides, borides and nitrides of elements from main groups II to IV and/or elements from transition groups I to VIII of the periodic table of the elements, including the lanthanides. Particularly preferred particles of component C) are silicon oxide, aluminium oxide, cerium oxide, zirconium oxide, niobium oxide and titanium oxide. Silicon oxide nanoparticles are most particularly preferred.

The particles used in C) preferably have average particle sizes, by means of dynamic light scattering in dispersion determined as number average value of 5 to 100 nm, with particular preference 5 to 50 nm.

Preferably at least 75%, with particular preference at least 90%, with very particular preference at least 95% of all the particles used in C) have the sizes defined above.

If the particles used in C) are to be surface-modified, they are reacted with silanization, for example, before incorporation into the modified polyisocyanate. This method is known in the literature and described for example in DE-A 19846660 or WO 03/44099.

It is also possible to modify the surfaces adsorptively/associatively by means of surfactants or block copolymers, as they are modified, for example, in WO 2006/008120 or Foerster, S. & Antonietti, M., Advanced Materials, 10, No. 3, (1998) 195.

Preferred surface modification is the silanization with alkoxysilanes and/or chlorosilanes.

Examples of commercial particle dispersions of the kind suitable for C) are Organosilicasol™ (Nissan Chemical America Corporation, USA), Nanobyk® 3650 (BYK Chemie, Wesel, Germany), Hanse XP21/1264 or Hanse XP21/1184 (Hanse Chemie, Hamburg, Germany), HIGHLINK®NanO G (Clariant GmbH, Sulzbach, Germany). Suitable organosols have a solids content of 10% to 60% by weight, preferably 15% to 50% by weight.

The amount of the particles used in C) (counted as solids) relative to the overall system composed of modified polyisocyanate and particles is typically 1% to 70%, preferably 5% to 60%, with particular preference 25% to 55% by weight.

The solids content of nanoparticle-containing PICs according to the invention is 20% to 100%, preferably 40% to 90%, more preferably 40% to 70% by weight.

The invention further provides the nanoparticle-modified polyisocyanates obtainable in accordance with the invention, and polyurethane systems comprising them.

Depending on whether the NCO groups of the polyisocyanates of the invention have been blocked, polyurethane systems of this kind may be formulated as 1-component or 2-component PU systems.

As well as the nanoparticle-modified polyisocyanates of the invention, the polyurethane systems of the present invention comprise polyhydroxy and/or polyamine compounds for crosslinking. In addition there may also be further polyisocyanates, different from the polyisocyanates of the invention, and also auxiliaries and additives present.

Examples of suitable polyhydroxyl compounds are trifunctional and/or tetrafunctional alcohols and/or the polyetherpolyols, polyesterpolyols and/or polyacrylatepolyols that are typical per se in coating technology.

For crosslinking it is also possible, furthermore, to use polyurethanes or polyureas which are crosslinkable with polyisocyanates on the basis of the active hydrogen atoms present in the urethane or urea groups, respectively.

Likewise possible is the use of polyamines, whose amino groups may have been blocked, such as polyketimines, polyaldimines or oxazolanes.

Polyacrylatepolyols and polyesterpolyols are preferably employed for crosslinking the polysiocyanates of the invention.

Auxiliaries and additives used may be solvents such as butyl acetate, ethyl acetate, 1-methoxy-2-propyl acetate, toluene, 2-butanone, xylene, 1,4-dioxane, diacetone alcohol, N-methylpyrrolidone, dimethylacetamide, dimethylformamide, dimethyl sulphoxide or any desired mixtures of such solvents. Preferred solvents are butyl acetate, 2-ethyl acetate and diacetone alcohol.

Furthermore it is possible as auxiliaries and additives for inorganic or organic pigments, light stabilizers, coatings additives, such as dispersing, flow control, thickening, defoaming and other auxiliaries, adhesion agents, fungicides, bactericides, stabilizers or inhibitors and catalysts to be present.

The application of the polyurethane systems of the invention to substrates takes place in accordance with the application techniques that are typical in coating technology, such as spraying, flowcoating, dipping, spincoating or knifecoating, for example.

The nanoparticle-modified polyisocyanates of the invention and the polyurethane systems based on them are suitable for producing polyurethane adhesives, polyurethane coating materials and polyurethane coatings.

EXAMPLES

Unless noted otherwise, the percentages are to be understood as being percent by weight.

The hydroxyl number (OH number) was determined in accordance with DIN 53240-2.

The viscosity was determined using a RotoVisco 1 rotational viscometer from Haake, Germany, in accordance with DIN EN ISO 3219.

The acid number was determined in accordance with DIN EN ISO 2114.

The colour number (APHA) was determined in accordance with DIN EN 1557.

The NCO content was determined in accordance with DIN EN ISO 11909.

Desmodur®N3300: Hexamethylene diisocyanate trimer; NCO content 21.8+/−0.3% by weight, viscosity at 23° C. about 3000 mPa·s, Bayer MaterialScience AG, Leverkusen, DE Desmodur® Z4470 BA: IPDI isocyanurate, 70% in butyl acetate, with a viscosity at 23° C. of 600 mPa·s, an average NCO content of 11.9% and an NCO functionality of 3.2, Bayer MaterialScience AG, Leverkusen, DE Desmodur® IL 1351: TDI isocyanurate, 51% by weight in butyl acetate, NCO content 8% by weight, equivalent weight 525; viscosity at 23° C. 1600 mPas, Bayer MaterialScience AG, Leverkusen, DE Desmodur® VPLS 2253: 3,5-dimethylpyrazole-blocked polyisocyanate (trimer) based on HDI; 75% in MPA/SN 100 (8:17), viscosity at 23° C. about 3600 mPas, blocked NCO content 10.5%, equivalent weight 400, Bayer MaterialScience AG, Leverkusen, DE Desmodur® PL 340: 3,5-dimethylpyrazole-blocked polyisocyanate based on IPDI, 60% in BA/SN, blocked NCO content 7.3%, viscosity 600 mPas at 23° C., equivalent weight 575, Bayer MaterialScience AG, Leverkusen, DE Desmophen® 670 BA: hydroxyl-containing polyester with a hydroxyl content of 3.5%, a low degree of branching, a viscosity of 2800 mPa·s (23 DEG C.) and an equivalent weight of 485, Bayer MaterialScience AG, Leverkusen, DE Organosilicasol™ MEK-ST: colloidal silica dispersed in methyl ethyl ketone, particle size 10-15 nm, 30 wt % $SiO_2$, <0.5 wt % $H_2O$, <5 mPa s viscosity, Nissan Chemical America Corporation, USA Baysilone® coatings additive OL 17: flow control assistant, 10% by weight in xylene, Borchers GmbH, Langenfeld, DE)

BYK® 070: defoamer, BYK-Chemie GmbH, Wesel, DE

Tinuvin® 123: HALS amine, Ciba Specialty Chemicals, Basel, CH

Tinuvin® 384-2: UV absorber, Ciba Specialty Chemicals, Basel, CH

Modaflow®: flow control assistant, 1% by weight in xylene, Cytec Surface Specialties GmbH Solvent naphtha 100: aromatic-containing solvent mixture
Dynasilan® 1505: 3-aminopropylmethyldiethoxysilane, Degussa-Hüls AG, DE Determination of Particle Size The particle sizes were determined by means of dynamic light scattering using an HPPS particle size analyser (Malvern, Worcestershire, UK). Evaluation was carried out via the Dispersion Technology Software 4.10. To prevent multiple scattering, a highly dilute dispersion of the nanoparticles was prepared. One drop of a dilute nanoparticle dispersion (approximately 0.1%-10%) was placed in a cuvette containing approximately 2 ml of the same solvent as the dispersion, and the cuvette was shaken and placed for measurement in the HPPS analyser at 20 to 25° C. As is general knowledge to the person skilled in the art, the relevant parameters of the dispersing medium—temperature, viscosity and refractive index—were entered into the software beforehand. In the case of organic solvents the cuvette used was of glass. The result obtained was a plot of intensity and/or volume against particle diameter, and also the Z-average value for the particle diameter. Care was taken to ensure that the polydispersity index was <0.5.

Example 1

In accordance with the teaching of U.S. Pat. No. 5,364,955, Example 5, diethyl N-(3-trimethoxysilyl-propyl)aspartate was prepared by reacting equimolar amounts of 3-aminopropyltrimethoxysilane with diethyl maleate.

Example 2

A 5 l stainless steel pressure reactor with stirrer, distillation equipment, reservoir containers for monomer mixture and initiator, including metering pumps, and automatic temperature regulation was charged with 3155 g of trimethylolpropane and 1345 g of ε-caprolactone and 2.2 g of dibutyltin dilaurate (DBTL). The reactor contents were heated to 160° C., stirred at 160° C. for 6 hours and then cooled to 20° C., giving a clear, pale-coloured resin with the following characteristics:

| Solids content: | 99.5% by weight |
|---|---|
| Viscosity at 23° C.: | 4100 mPa·s |
| Acid number: | 0.5 mg KOH/g |
| Hydroxyl number: | 881 mg KOH/g |
| Hydroxyl content: | 26.7% by weight |
| Hazen colour number: | 44 APHA |
| Appearance:: | clear |

Example 3

A 15 l stainless steel pressure reactor with stirrer, distillation equipment, reservoir containers for monomer mixture and initiator solution, including metering pumps, and automatic temperature regulation was charged with 3375 g of Solventnaphtha® 100 and this initial charge was heated to 160° C. Then, beginning simultaneously but through separate feeds, a monomer mixture consisting of 1457 g of styrene, 2945 g of hydroxyethyl methacrylate, 4524 g of butyl acrylate, 148 g of acrylic acid and 128 g of Nisso B1000 (polybutadiene, Nippon Soda, Japan) was metered in over 3 hours and an initiator solution consisting of 383 g of di-tert-butyl peroxide and 540 g of Solventnaphtha®100 was metered in over 3.5 hours, the polymerization temperature being kept virtually constant (±2° C.). This was followed by stirring at 160° C. for an hour. The batch was then cooled to 80° C. and 399 g of the oligoester from Example 2 were metered in. After subsequent stirring at 80° C. for 30 minutes, cooling was carried out to 40° C. and the product was filtered through a filter (Supra T5500, pore size 25-72 µm, Seitz-Filter-Werke GmbH, Bad Kreuznach, DE). This gave a clear, pale-coloured resin solution having the following characteristics:

| Solids content: | 70.0% by weight |
|---|---|
| Viscosity at 23° C.: | 3793 mPa·s |
| Acid number: | 9.7 mg KOH/g |
| Hydroxyl number: | 112 mg KOH/g |
| Hydroxyl content: | 3.39% by weight |
| Hazen colour number: | 10 APHA |
| Appearance:: | clear |

Example 4

In a 5 L glass flask with stirrer, with introduction of 2 L/h nitrogen, 2557 g of 3-methyl-1,5-pentanediol were dewatered with 0.6 g of ytterbium (III) acetylacetonate at 90° C. and 20 mbar for 2 h. Subsequently, for the transesterification to be carried out, a reflux condenser was mounted, 2300 g of dimethyl carbonate were added at 90° C., and then the mixture was heated under reflux at 98° C. for 24 h. Following removal of the reflux condenser and the mounting of a Claisen bridge and a condenser, the temperature was raised to 150° C., the batch was heated at 4 h, then the temperature was raised to 180° C. and the batch was again heated for 4 h. After cooling to 130° C., the temperature was cautiously raised to 180° C. at 20 mbar, under 2 L/h nitrogen, and vacuum distillation was carried out at a constant overhead temperature of 60° C. for at least 6 h. OH number and viscosity were measured at 75° C. To achieve the characteristic numbers, correction was carried out, where appropriate, by adding dimethyl carbonate or diol (with heating at 110 to 130° C. for 8 h). Admission of air and cooling of the reaction batch to room temperature gave a colourless oligocarbonate diol having the following characteristic numbers:

$M_n$=650 g/mol; OH number=166 mg KOH/g; OH content 5.03%; viscosity: 4150 mPas at 23° C.

Example 5

In a standard stirred apparatus 192.7 g of Desmodur® N3300 in 85 g of butyl acetate were introduced initially at 60° C. Then 70.3 g of the alkoxysilane from Example 1 was added cautiously dropwise, the temperature being held at a maximum of 60° C. After the end of the reaction (testing of the NCO content for constancy by IR spectroscopy) the mixture was cooled to RT, 76.9 g of 1,3-dimethylpyrazole (DMP) were added cautiously and the temperature was held at 50° C. until the NCO peak in the IR spectrometer had disappeared.

A colourless, liquid, blocked polyisocyanate was obtained which had the following characteristic numbers: solids content 80% by weight, viscosity 3440 mPas at 23° C.

Example 6

In a standard stirred apparatus 682 g (1 eq NCO) of Desmodur® Z4470 BA and 172.7 g of butyl acetate were introduced initially at 0° C. Subsequently, with vigorous stirring and nitrogen blanketing, 72.51 g (0.2 mol) of 3-aminopropylmethyldiethoxysilane in 172.7 g of butyl acetate were added dropwise over a period of 3 h and the NCO content was tested. The resulting adduct has an NCO content of 5.74% by weight and a solids content of 49.4% by weight. It was filtered off on a depth filter (T5500, Pall Corporation).

Example 7

In analogy to the procedure in Example 6, 1389.6 g (1 eq) of the unmodified polyisocyanate Desmodur® Z4470 BA were reacted with 37.03 (0.05 mol) of 3-aminopropylmethyldiethoxysilane. The resulting product had an NCO content of 7.71% by weight and a solids content of 49.8% by weight Example 8

In analogy to the procedure in Example 6, 820.9 g (1 eq) of the unmodified polyisocyanate Desmodur® Z4470 BA were reacted with 181.11 (0.2 mol) of the aminosilane of Example 1. The resulting product had an NCO content of 4.96% by weight and a solids content of 49.8% by weight Example 9

In analogy to the procedure in Example 6, 885.84 g (1 eq) of the unmodified polyisocyanate Desmodur®N3300 were reacted with 364.16 (0.2 mol) of the aminosilane of Example 1. The resulting product had an NCO content of 6.00% by weight and a solids content of 49.3% by weight Example 10

In analogy to the procedure in Example 6, 378.3 g (1 eq) of the unmodified polyisocyanate Desmodur® IL 1351 were reacted with 57.1 g (0.2 mol) of the aminosilane of Example 1. The resulting product had an NCO content of 4.64% by weight and a solids content of 50.0% by weight Example 11

387.3 g of the product from Example 6 were charged to a standard stirred apparatus and admixed over the course of 30 min with 712.69 g of Organosilicasol™ MEK-ST. The resulting modified polyisocyanate was transparent and had an NCO content of 2.0% by weight with a solids content of 38.4% by weight. The fraction of $SiO_2$ nanoparticles was 19.4% by weight in the dispersion and 50.6% by weight in the solid.

Examples 12 to 19

In analogy to Example 11 the amounts of modified polyisocyanates indicated below were added with Organosilicasol™ MEK-ST. The resulting NCO and solids contents are likewise listed below. In Example 16 and Example 17 the solids content was adjusted by concentration on a rotary evaporator at 60° C. and 120 mbar.

TABLE 1

| Ex. | Polyisocyanate | Silica sol | NCO/solids content [% by weight] | $SiO_2$ in solids [% by weight] |
| --- | --- | --- | --- | --- |
| 12 | 1285.8 g (Ex. 6) | 714.2 g | 3.7/43.4 | 24.7 |
| 13 | 387.3 g (Ex. 6) | 712.7 g | 2.01/38.4 | 50.6 |
| 14 | 249.0 g (Ex. 6) | 851.0 g | 1.29/36.1 | 64.3 |
| 15 | 642.3 g (Ex. 7) | 457.7 g | 4.43/42.1 | 30.0 |
| 16 | 331.2 g (Ex. 8) | 568.8 g | 2.78/59.6 | 51.2 |
| 17 | 50.2 g (Ex. 9) | 49.8 g | 4.55/55.1 | 15.0 |
| 18 | 13.34 g (Ex. 5) | 36.7 g | (7.91 blocked)/43.34 | 35.0 |
| 19 | 58.3 g (Ex. 10) | 41.7 g | 2.73/41.7 | 30.0 |

Example 20

A 2 L flask was charged with 500 g of Organosilicasol™ MEK-ST and 500 g of butyl acetate. The dispersion was concentrated on a rotary evaporator at 60° C. and 120 mbar and the residue was made up again with 500 g of butyl acetate. This procedure was repeated until the methyl ethyl ketone fraction in the dispersion had dropped to <0.1% by weight (determined by means of GC-FID).

Not only the Organosilicasol™ MEK-ST used in Example 8 but also the butyl acetate and the resulting dispersion in butyl acetate were each dried over 4 A molecular sieve.

The water content of the resulting silica organosol in butyl acetate was 440 ppm. The solids content was adjusted to 30% by weight. The number average value by means of dynamic light scattering was at 23 nm.

Example 21

In analogy to Example 11, 35.2 g of the modified polyisocyanate from Example 9 were admixed with 80 g of the organosilica sol of Example 20. This gave an NCO content of 2.39% by weight, a solids content of 37.5% by weight and an $SiO_2$ content, based on solids content, of 50% by weight.

In each of experiments 11 to 19 and 21, colloidally stable, non-sedimenting and transparent or translucent dispersions were obtained. Crosslinking of the polyisocyanates thus modified with Desmophen® 670 BA gave transparent surface coatings.

Examples 22 to 24

For comparison purposes, in analogy to Examples 11 to 19, non-modified polyisocyanates were admixed with Organosilicasol™ MEK-ST. In each case highly turbid mixtures were obtained from which it was not possible to produce transparent surface coatings.

TABLE 2

| Ex. | Polyisocyanate | Silica sol | NCO/solids content [% by weight] | $SiO_2$ in solids [% by weight] |
| --- | --- | --- | --- | --- |
| 22 | 356 g Desmodur® Z4470 BA | 245.7 g | 4.96/43.1 | 4.8 |
| 23 | 180 g Desmodur® VPLS 2253 | 150.0 g | 10.5 blocked)/54.55 | 70.0 |
| 24 | 219 g Desmodur® PL340 | 146.0 g | (7.3 blocked)/48 | 70.0 |

Example 25

Coating Formulation Comprising 52.1 g of the polyols from Examples 3 and 4 in a weight ratio of 9:1
76.7 g of aminosilane-modified polyisocyanate from Example 6
0.8 g of Baysilone® coatings additive OL 17
1.5 g of BYK® 070
0.8 g of Tinuvin® 123
1.1 g of Tinuvin® 384-2
66.8 g of solvent mixture: 1-methoxyprop-2-yl acetate/ Solventnaphtha® 100 (weight ratio 1:1)

The polyol mixture was introduced initially, additives and light stabilizers were weighed in, and the components were mixed thoroughly with stirring. After that the polyisocyanate and the solvent mixture were added and thorough stirring was again carried out. Before being processed, the coating material was deaerated for 10 minutes. The coating material was then applied to the prepared substrate in 1.5 cross-passes using a gravity-feed cup-type gun (3.0-3.5 bar compressed air, nozzle: 1.4-1.5 mm Ø, nozzle-substrate distance: about 20-30 cm). After a flash-off time of 15 min the coating material was baked at 140° C. for 25 min. The dry film thickness was in each case about 40 μm. After conditioning/ageing at 60° C. for 16 h, coatings testing was commenced.

Example 26

Coating Formulation Comprising 32.9 g of mixture of polyols from Examples 3 and 4 in a weight ratio of 9:1
141.7 g of nanoparticle-modified polyisocyanate from Example 11
0.8 g of Baysilone® coatings additive OL 17
1.5 g of BYK® 070
0.8 g of Tinuvin® 123
1.1 g of Tinuvin® 384-2
21.1 g of solvent mixture: 1-methoxyprop-2-yl acetate/ Solventnaphtha® 100 (weight ratio 1:1)

Coating material preparation and processing took place in accordance with Example 25.

Example 27

Coating Formulation Comprising 78.1 g of mixture of polyols from Examples 3 and 4 in a weight ratio of 9:1
57.8 g of Desmodur Z 4470 BA
1.0 g of Baysilone® coatings additive OL 17
1.0 g of Modaflow®
1.9 g of Tinuvin® 123
2.9 g of Tinuvin® 384-2
57.3 g of solvent mixture: 1-methoxyprop-2-yl acetate/ Solventnaphtha® 100 (weight ratio 1:1)

Coating material preparation and processing took place in accordance with Example 25.

TABLE 3

| Technological coatings testing | Example 25 | Example 26 | Example 27 |
|---|---|---|---|
| Spraying solids content [%] | 40.0 | 40.0 | 50.0 |
| $SiO_2$ fraction in coating film [%] | 0 | 36.1 | 0 |
| Visual assessment of coating material | clear surface ok | clear surface ok | clear surface ok |
| Clearcoat film thickness [μm] | 40-42 | 50 | 45-50 |
| König pendulum damping | | | |
| [swings] | 135 | 145 | 140 |
| [s] | 189 | 203 | 196 |
| Solvent resistance (X/MPA/EA/Ac)[rating][1] | | | |
| 1 min. | 0 0 1 2 | 0 0 0 1 | 0 0 0 1 |
| 5 min. | 0 0 3 4 | 0 0 0 2 | 0 0 3 3 |
| Chemical resistance (Gradient oven) [° C.] | | | |
| Tree resin | 52 | 58 | 52 |
| Pancreatin, 50% | 36 | 36 | 36 |
| DI water | >68 | >68 | >68 |
| NaOH, 1% | >68 | >68 | >68 |
| $H_2SO_4$, 1% | 48 | 51 | 53 |
| FAM petrol, 10 min. [rating][1] | 3 | 1 | 3 |
| Scratch resistance Amtec Kistler laboratory carwash | | | |
| Initial gloss 20° | 85.3 | 83.4 | 86.7 |
| Loss of gloss (Δgl.) after 10 wash cycles, 20° | 22.7 | 20.2 | 23.9 |
| Relative residual gloss [%] | 73.4 | 75.8 | 72.4 |
| Relative residual gloss after reflow 2 h 60° C. [%] | 76.4 | 77.2 | 76.2 |
| Hammer test + steel wool | | | |
| Initial gloss 20° | 85.3 | 83.4 | 86.7 |
| Loss of gloss (Δgl.) after 10 back-and-forth strokes, 20° | 68.6 | 41.1 | 61.0 |
| Relative residual gloss [%] | 19.6 | 50.7 | 29.4 |
| Relative residual gloss after reflow 2 h 60° C. [%] | 23.7 | 61.3 | 40.7 |
| Hammer test + polishing paper | | | |
| Initial gloss 20° | 85.3 | 83.4 | 86.7 |
| Loss of gloss (Δgl.) after 10 back-and-forth strokes, 20° | 69.7 | 47.6 | 52.9 |
| Relative residual gloss [%] | 18.3 | 43.2 | 39.0 |
| Relative residual gloss after reflow 2 h 60° C. [%] | 22.2 | 49.3 | 44.8 |
| Storage stability (3 days RT) | increase in viscosity | ok | solid |

[1]rating 0 (good) to 5 (poor)

König pendulum damping in accordance with DIN EN ISO 1522 "Pendulum damping test"
Chemical resistance in accordance with DIN EN ISO 2812-5 "Coating materials—Determination of resistance to liquids—Part 5: method with the gradient oven"
Laboratory carwash scratch resistance (wet marring) in accordance with DIN EN ISO 20566 "Coating materials—Testing of the scratch resistance of a coating system with a laboratory carwash"

Determination of the Solvent Resistance

This test was used to ascertain the resistance of a cured coating film to various solvents. For that purpose the solvents are left to act on the surface of the coating material for a defined time. Subsequently an assessment is made, visually and by touching with the hand, of whether and, if so, which changes have occurred on the test area. In general the coating film is located on a glass plate, though other substrates are also possible. The test tube stand containing the solvents xylene, 1-methoxyprop-2-yl acetate, ethyl acetate and acetone (see below) is placed on the surface of the coating material such that the openings of the test tubes with the cotton wool plugs are lying on the film. The important factor is the resulting wetting of the surface of the coating material by the solvent. After the predetermined exposure time of the solvents, of 1 minute and 5 minutes, the test tube stand is removed from the surface of the coating material. The residues of solvent are removed immediately after that, using an absorbent paper or cloth. The test area is then immediately inspected for changes after cautious scratching with the fingernail. The following grades are distinguished:

| | |
|---|---|
| 0 = unchanged | |
| 1 = trace change | e.g. only visible change |
| 2 = slightly changed | e.g. perceptible softening can be found with the fingernail |
| 3 = markedly changed | e.g. severe softening can be found with the fingernail |
| 4 = highly changed | e.g. with the fingernail down to the substrate |
| 5 = destroyed | e.g. surface of coating material destroyed without extraneous exposure |

The evaluation grades found for the solvents indicated above are documented in the following order:

| | | |
|---|---|---|
| Example | 0000 | (no change) |
| Example | 0001 | (visible change only in the case of acetone) |

The numerical sequence here describes the sequence of solvents tested (xylene, methoxypropyl acetate, ethyl acetate, acetone)

Determination of the Scratch Resistance by the Hammer Test (Dry Marring)

The marring is carried out using a hammer (weight: 800 g without shaft) whose flat face has steel wool or polishing paper attached. The hammer is placed carefully, at right angles, onto the coated surface, and is guided in a track over the coating without tipping and without additional physical force. 10 back-and-forth strokes are executed. Following exposure to the marring medium, the test area is cleaned with a soft cloth and then the gloss is measured in accordance with DIN EN ISO 2813 transversely to the direction of marring. Only homogeneous regions are measured.

Notes in Relation to the Examples:

Inventively modified polyisocyanates from Examples 5 to 10, after blending with Organosilicasol™ MEK-ST, gave, in Examples 11 to 19 and 21, colloidally stable, liquid, non-sedimenting, transparent or translucent dispersions from which it was possible to make transparent films with—for example—Desmophen® 670 BA. In contrast, polyisocyanates without inventive modification, in Examples 22 to 24, become severely turbid following addition of Organosilicasol™ MEK-ST.

In Examples 23 and 24 the fully blocked polyisocyanates Desmodur® VPLS 2253 and Desmodur® PL 340 were blended with Organosilicasol™ MEK-ST. In the short term the polyisocyanate-silica dispersions became cloudy. Example 18 is based on an HDI isocyanurate which, in accordance with the invention and with Example 5, has 0.2 eq of the NCO groups reacted with an amino silane, the remaining groups being blocked with 1,3-dimethylpyrazole. This inventive polyisocyanate, in contrast, did not exhibit any turbidity after blending with Organosilicasol™ MEK-ST.

In Example 25 the IPDI isocyanurate Desmodur® Z4470 BA was blended with Organosilicasol™ MEK-ST—turbidity occurred. When, in contrast, Desmodur® Z4470 BA was reacted inventively with the alkoxysilanes from Example 1 or with 3-aminopropylmethyldiethoxysilane at 0.05 or 0.2 eq, transparent dispersions were formed after blending with the organosol (Examples 12-16), even when no residual blocking was carried out.

Table 3 sets out the technological coatings tests. In Example 25 the alkoxysilane-modified polyisocyanate from Example 6 was used as the curative component, in Example 26 the inventive, corresponding, organosilica sol-modified alkoxysilane polyisocyanate from 11, and in Example 27 the Desmodur® Z4470 BA that likewise forms the basis for Examples 25 and 26. The nanoparticle-modified, inventive curative in Example 26 led to an improvement in the profile of properties of the resulting film. Pendulum damping, solvent resistance to ethyl acetate and acetone, chemical resistance to tree resin, and the FAM petrol resistance (super-grade petrol, in accordance with Fachausschuβ Mineralöle [FAM; German Mineral Oils Technical Committee]) were better than the nanoparticle-free comparative. In terms of wet marring a slight improvement was evident in the inventive Example 26. Significantly better here were the values for the dry marring (high relative residual gloss before and after reflow, low loss of gloss). The storage stability of the coating material mixture was likewise improved (no thickening).

The invention claimed is:

1. Process for preparing a dispersion, stable with respect to viscosity and agglomeration, of nanoparticle-modified polyisocyanates, the process comprising the steps of
   1) reacting A) polyisocyanates with B) alkoxysilanes of the formula (I)

$$Q\text{-}Z\text{—}SiX_aY_{3-a} \quad (I)$$

in which
   Q is an isocyanate-reactive group,
   X is a hydrolysable group,
   Y is identical or different alkyl groups,
   Z is a $C_1$-$C_{12}$ alkylene group and
   a is an integer from 1 to 3,
   and subsequently
   2) incorporating by dispersion C) inorganic particles having an average particle size of less than 200 nm as determined by means of dynamic light scattering in dispersion, wherein the inorganic particles have been surface-modified by silanisation with alkoxysilanes and/or chlorosilanes;
   wherein the ratio of free NCO groups of the polyisocyanates of component A) for modification to the NCO-reactive groups Q of the alkoxysilane of the formula (I) is 1:0.01 to 1:0.75.

2. Process according to claim 1, wherein component A) comprises polyisocyanates based on one or more diisocyanates selected from the list consisting of isophorone diisocyanate, 2,4'- and 4,4'-diisocyanatodiphenylmethane, 2,4'- and 2,6'-diisocyanatotoluene, 1,6-diisocyanatohexane and mixtures thereof.

3. Process according to claim 1, wherein in formula (I) the group Q is a group which reacts towards isocyanates with formation of urethane, urea or thiourea, X is a methoxy, ethoxy, propoxy or butoxy group, Y is a methyl or ethyl group, Z is a linear or branched $C_1$-$C_4$ alkylene group and a is equal to 1 or 2.

4. Process according to claim 1, wherein the alkoxysilanes of the formula (I) are aspartic esters containing secondary amino groups or are di- and/or monoalkoxysilanes.

5. Process according to claim 1, characterized in that, following the reaction with B), any remaining free NCO groups are blocked with a blocking agent.

6. Process according to claim 1, wherein in C) inorganic oxides, hydroxides, sulphates, carbonates, mixed oxides, carbides, borides and nitrides of elements from main groups II to IV and/or elements from transition groups I to VIII of the periodic table, including the lanthanides, are used.

7. Process according to claim 1, wherein the average particle sizes of the particles are 5 to 50 nm.

8. Process according to claim 1, wherein at least 90% of all the particles used in C) have a particle size of from 5 to 50 nm.

9. Nanoparticle-modified polyisocyanates obtained by a process according to claim 1.

10. Polyurethane compositions obtained using nanoparticle-modified polyisocyanates according to claim 9.

11. Polyurethane compositions according to claim 10, wherein the compositions are polyurethane adhesives, polyurethane coating materials or polyurethane coatings.

* * * * *